(12) United States Patent
Cohen et al.

(10) Patent No.: US 12,253,423 B2
(45) Date of Patent: Mar. 18, 2025

(54) THERMAL SENSOR INTEGRATION FOR SYSTEM TEMPERATURE MANAGEMENT

(71) Applicant: Mellanox Technologies, Ltd., Yokneam (IL)

(72) Inventors: Shai Cohen, Haifa (IL); Amihai Moshe Kopel, Binyamina (IL); Beeri Halachmi, Kefar Sava (IL); Alexander Kaminsky, Kiryat Bialik (IL)

(73) Assignee: Mellanox Technologies, Ltd., Yokneam (IL)

( * ) Notice: Subject to any disclaimer, the term of this patent is extended or adjusted under 35 U.S.C. 154(b) by 485 days.

(21) Appl. No.: 17/729,328

(22) Filed: Apr. 26, 2022

(65) Prior Publication Data
US 2023/0273072 A1 Aug. 31, 2023

Related U.S. Application Data

(60) Provisional application No. 63/313,826, filed on Feb. 25, 2022.

(51) Int. Cl.
| | |
|---|---|
| *G01K 3/06* | (2006.01) |
| *G01K 1/02* | (2021.01) |
| *G01K 3/00* | (2006.01) |
| *G01K 7/00* | (2006.01) |

(52) U.S. Cl.
CPC ............ *G01K 3/06* (2013.01); *G01K 1/026* (2013.01); *G01K 3/005* (2013.01); *G01K 7/00* (2013.01)

(58) Field of Classification Search
CPC .......... G01K 3/06; G01K 1/026; G01K 3/005; G01K 7/00; G01K 2003/145
See application file for complete search history.

(56) References Cited

U.S. PATENT DOCUMENTS

| | | | |
|---|---|---|---|
| 2004/0264093 A1* | 12/2004 | Boerstler | G01K 7/01 374/E1.005 |
| 2006/0289862 A1 | 12/2006 | Yoshida et al. | |
| 2009/0166794 A1* | 7/2009 | Mowry | G01K 1/14 438/54 |

(Continued)

FOREIGN PATENT DOCUMENTS

| | | |
|---|---|---|
| CN | 1178406 A | 4/1998 |
| JP | H01301131 A | 12/1989 |

(Continued)

OTHER PUBLICATIONS

Wikipedia, "Temperature gradient", https://en.wikipedia.org/rv/index.php?title=Temperature_gradient&oldid=1129210855, downloaded Nov. 20, 23, 3 pages.

(Continued)

*Primary Examiner* — Mirellys Jagan
(74) *Attorney, Agent, or Firm* — Lowenstein Sandler LLP

(57) ABSTRACT

A system includes a memory device and a processing device, operatively coupled to the memory device, to perform operations including receiving, from a thermal sensor group including thermal sensors, hotspot temperature measurements with respect to a hotspot. Each temperature measurement is received from a respective thermal sensor. The operations further include determining, from the temperature measurements, a generalized hotspot temperature measurement for the thermal sensor group.

20 Claims, 6 Drawing Sheets

(56) References Cited

U.S. PATENT DOCUMENTS

| | | |
|---|---|---|
| 2017/0074729 A1* | 3/2017 | Coutts .................... G05B 15/02 |
| 2017/0168514 A1* | 6/2017 | Mittal .................... G06F 1/3206 |
| 2017/0277564 A1 | 9/2017 | Coteus et al. |

FOREIGN PATENT DOCUMENTS

| | | | | |
|---|---|---|---|---|
| WO | WO-2013017748 A1 | * | 2/2013 | ............. G01K 1/143 |
| WO | 2014182451 A1 | | 11/2014 | |

OTHER PUBLICATIONS

Thoad, Janet, "From everyday laboratory life: Systematic and random errors", https://web.archive.org/web/20220808082849/https:/mpl.loesungsfabrik.de/blog/method-validation/error-types, Mar. 6, 2020, 4 pages.

Student Encyclopedia, "Error Considerations", https://web.archive.org/web/20221110071121/https://www.lernhelfer.de/schuelerlexikon/ physics-abitur/articles/error observations, Nov. 29, 2023, 12 pages.

Office Action for German Patent Application No. 102023201724.5, mailed Nov. 3, 2023, 19 Pages.

* cited by examiner

THERMAL SENSOR INTEGRATION FOR SYSTEM TEMPERATURE MANAGEMENT

RELATED APPLICATIONS

This application claims the benefit of U.S. Provisional Application 63/313,826 filed on Feb. 25, 2022 and entitled "Thermal Sensor Integration for System Temperature Management," the entire contents of which are incorporated by reference herein.

TECHNICAL FIELD

At least one embodiment pertains to system temperature management. For example, at least one embodiment pertains to technology for thermal sensor integration for system temperature management, such as integrated circuit temperature management.

BACKGROUND

Thermal sensors, also referred to as temperature sensors, can be used to measure (e.g., estimate) temperature within a system. One example of a system is an integrated circuit. For example, a thermal sensor can be used to measure the temperature of a hotspot within an integrated circuit. A hotspot can refer to a hottest temperature point from which a temperature gradient expands outward. A temperature management system can use hotspot temperature measurements to perform one or more temperature management operations within the system. A thermal sensor can be a "protection sensor" used to trigger a temperature management action in response to obtaining a hotspot temperature measurement that exceeds a protection threshold temperature. For example, a temperature management action may be taken to cool the system (e.g., turn on a fan at a particular speed in accordance with the hotspot temperature measurement).

One way to estimate a hotspot temperature measurement is to apply a maximum temperature heuristic to a number of hotspot temperature measurements. More specifically, for a set of hotspot temperature measurements each obtained from a respective thermal sensor, the maximum hotspot temperature measurement of the set of hotspot temperature measurements can be identified as the estimated hotspot temperature measurement.

Ideally, the maximum temperature heuristic should be an accurate estimate of the hotspot temperature since the highest temperature measurement should be obtained by a thermal sensor that is closest to the hotspot. However, the accuracy of a hotspot temperature measurement made by a thermal sensor can be impacted by various factors. One factor that can impact the accuracy of a hotspot temperature measurement made by a thermal sensor is a thermal offset between the hotspot and the thermal sensor. The thermal offset can be determined from the temperature gradient between the hotspot and the position of the thermal sensor. Another factor that can impact the accuracy of a hotspot temperature measurement made by a thermal sensor is thermal sensor error (e.g., thermal sensor noise and/or residual calibration errors). Although thermal sensor noise can be filtered using, e.g., a low-pass filter, residual calibration errors (e.g., gain calibration errors, offset calibration errors and/or non-linearity errors), cannot be easily filtered. The maximum temperature heuristic can thus be susceptible to the selection of outliers due to thermal offset and/or thermal sensor error terms ("error terms").

Thermal sensor errors (e.g., thermal sensor noise) can be reduced using larger, more accurate thermal sensors with a regulated power supply. However, such thermal sensors cannot be placed close to a hotspot, which can negatively impact the thermal offset. Moreover, such thermal sensors can be more costly to implement and integrate. The thermal offset can be reduced by placing a number of thermal sensors closer to the hotspot. These sensors can be smaller and cheaper than those described above. However, some smaller thermal sensors may be noisier and more susceptible to calibration inaccuracies than the more accurate larger sensors, which negatively impacts thermal sensor error. Therefore, using the maximum temperature heuristic with respect to hotspot temperature measurements output by more error-prone thermal sensors can result in the selection of an inaccurate hotspot temperature measurement (e.g., the hotspot temperature measurement is higher than the actual temperature of the hotspot), which can decrease temperature management system effectiveness and/or efficiency (e.g., spending more resources to cool the system unnecessarily).

Accordingly, to reduce thermal sensor integration costs and improve temperature management within systems (e.g., integrated circuits), there is a need for an approach that integrates cheaper thermal sensors within systems to perform hotspot temperature measurements in a manner that mitigates error effects.

BRIEF DESCRIPTION OF DRAWINGS

Various embodiments in accordance with the present disclosure will be described with reference to the drawings, in which.

DETAILED DESCRIPTION

Figure 1A:
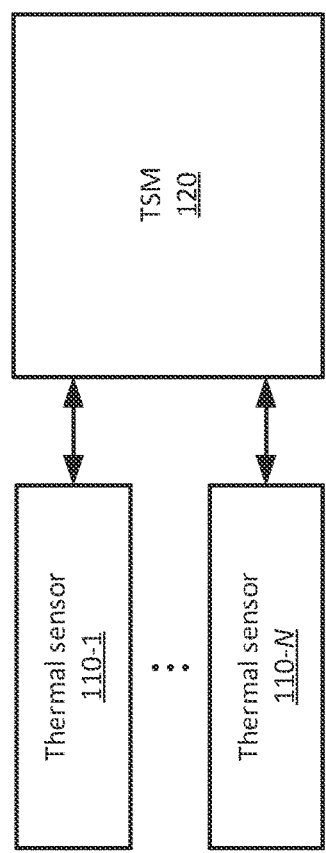
FIGS. 1A-1C are diagrams illustrating an example system architecture including a thermal sensor manager, in accordance with at least some embodiments.

As described above, various types of thermal sensor integrations may be needed to improve accuracy with respect to hotspot temperature measurements within systems (e.g., integrated circuits). Advantageously, aspects of the present disclosure are directed to improving accuracy of hotspot temperature measurements made by thermal sensors positioned about a hotspot. For example, since factors affecting hotspot temperature measurement accuracy (e.g., thermal offset and/or error terms (e.g., noise) can be deterministic in time and random in space and accuracy among individual thermal sensors can vary, a more accurate hotspot temperature measurement for a hotspot can be determined as a generalized hotspot temperature measurement derived from individual hotspot temperature measurements made by each of the thermal sensors located around the hotspot. The generalized hotspot temperature measurement is derived in a manner that mitigates the impact of one or more factors affecting hotspot temperature measurement accuracy (e.g., thermal offset and/or error terms (e.g., noise)

In an embodiment, a system (e.g., integrated circuit) can include a number of thermal sensors divided into a number of thermal sensor groups. Each thermal sensor group can correspond to a respective thermal domain of the system, where each thermal domain includes a respective potential hotspot. In some embodiments, each of the thermal sensor groups can include respective combinations of different types of thermal sensors. For a thermal domain, each thermal sensor within the corresponding thermal sensor group can obtain (e.g., estimate) an individual hotspot temperature measurement with respect to the hotspot in the thermal domain. A generalized hotspot temperature measurement for a hotspot within a thermal domain can be derived from the individual hotspot temperature measurements obtained from the thermal sensors of the corresponding thermal sensor group.

For example, the generalized hotspot temperature measurement for a hotspot within a thermal domain can be determined as an average hotspot temperature measurement of the individual hotspot temperature measurements obtained from the thermal sensors of the corresponding thermal sensor group. As mentioned above, the hotspot temperature measurement for a thermal sensor can be viewed as a sum of the actual temperature measurement for the sensor, a thermal offset between the thermal sensor and the hotspot, and an error term for the thermal sensor. Thus, the average hotspot temperature measurement can be viewed as the sum of the average actual temperature measurement for the thermal sensor group, the average thermal offset for the thermal sensor group, and the average error term for the thermal sensor group.

The thermal offsets for the thermal sensors can be determined in accordance with a particular power-usage use case of the system (e.g., integrated circuit). For example, the thermal offset can be determined in view of a maximum-power use case in which every component within the thermal domain is operational, since this is the use case in which the hotspot temperature would be highest as every component is operational. Therefore, the thermal offsets can be extracted in the context of the maximum-power use case, which can then be used for all power-usage use cases.

It is noted that the error terms of thermal sensors with a thermal sensor group may not be spatially correlated. For example, if a first thermal sensor positioned at a first location within a thermal sensor group has a first error term and a second thermal sensor positioned at a second location within the thermal sensor group has a second error term, then the first error term and the second error term can have a correlation of about zero. This means that the statistical variance ("variance") between the average error term and the individual error terms can decrease as the number of thermal sensors within the thermal sensor group increases. Similarly, the variance between the average thermal offset and the individual thermal offsets can decrease as the number of thermal sensors within the thermal sensor group increases. Therefore, the generalized hotspot temperature measurement can reduce the effect of outlier thermal sensors and serve as a more accurate hotspot temperature measurement than, e.g., the maximum hotspot temperature measurement.

As described above, the accuracy of the generalized hotspot temperature measurement for a hotspot within a thermal domain can increase as the number of thermal sensors within the corresponding thermal sensor group (e.g., size or cardinality of the thermal sensor group) increases. At some point, the benefit gained by adding another thermal sensor to a thermal sensor group within a thermal domain will not be worth the additional cost of adding the thermal sensor (e.g., the law of diminishing returns). Accordingly, the optimal number of thermal sensors within a thermal sensor group can be selected in a manner that balances accuracy and cost.

In some embodiments, each of the thermal sensor groups includes between 2 sensors and 16 sensors (e.g., $N \in [2, 16]$, where N is the number of thermal sensors in a thermal sensor group). In some embodiments, each of the thermal sensor groups includes between 4 sensors and 14 sensors (e.g., $N \in [4, 14]$). In some embodiments, each of the thermal sensor groups includes between 8 sensors and 12 sensors (e.g., $N \in [8, 12]$). In some embodiments, each of the thermal sensor groups includes 10 sensors. In some embodiments, at least one of the thermal domains thermal sensor groups includes a single sensor. In an embodiment, each of the thermal sensor groups includes a same number of thermal sensors. In some embodiments, at least one thermal sensor group includes a different number of thermal sensors than the other thermal sensor groups.

In an embodiment, the thermal sensors within a thermal sensor group are calibrated. For example, the calibration can include gain calibration and offset calibration. Gain calibration and offset calibration can be linear operations that are commutative with the temperature measurement averaging used to determine the generalized temperature measurement. Therefore, the calibration can be calculated on a thermal sensor group basis.

The generalized hotspot temperature measurement can be compared to a threshold temperature to determine whether the generalized hotspot temperature measurement exceeds the threshold temperature. If so, this means that a high-temperature condition exists within the thermal domain, and an action can be performed to address the high-temperature condition. For example, the hotspot can be cooled in accordance with the generalized hotspot temperature measurement. Since the generalized hotspot temperature measurement can reduce the impact of outlier hotspot temperature measurements, the generalized hotspot temperature measurement can reduce false-positive high-temperature condition determinations. Accordingly, the generalized hotspot temperature measurement can improve the ability of a temperature management system of a system (e.g., integrated circuit) to address high-temperature conditions in a manner that reduces resource consumption.

Figure 1B:
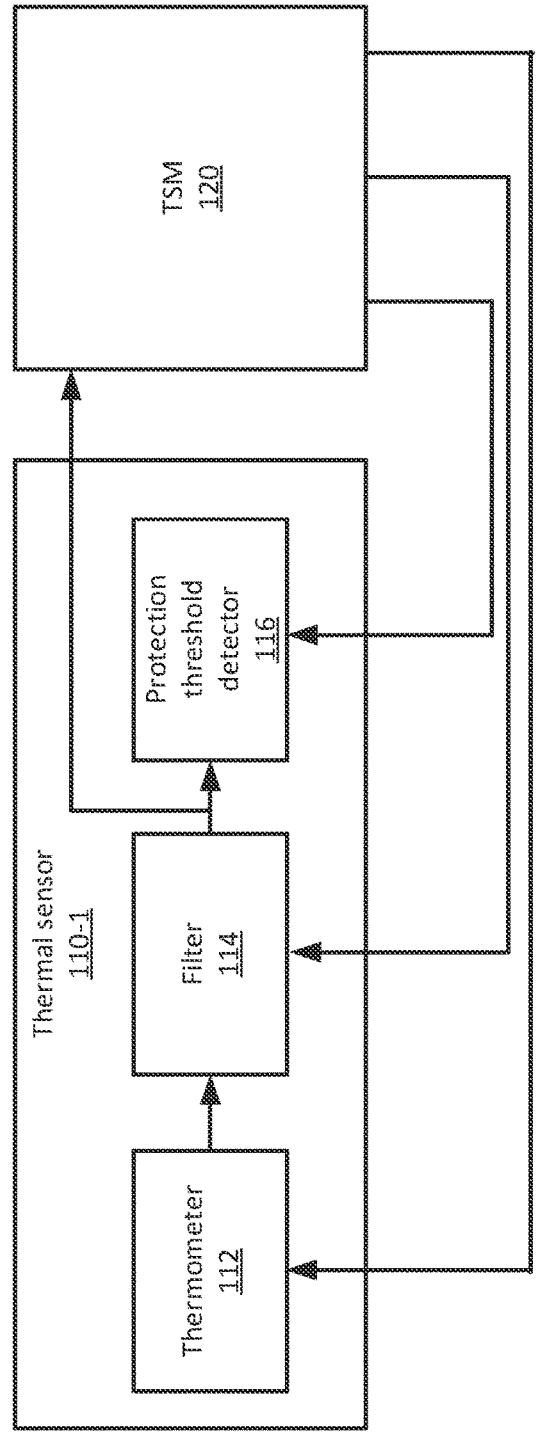
Figure 1C:
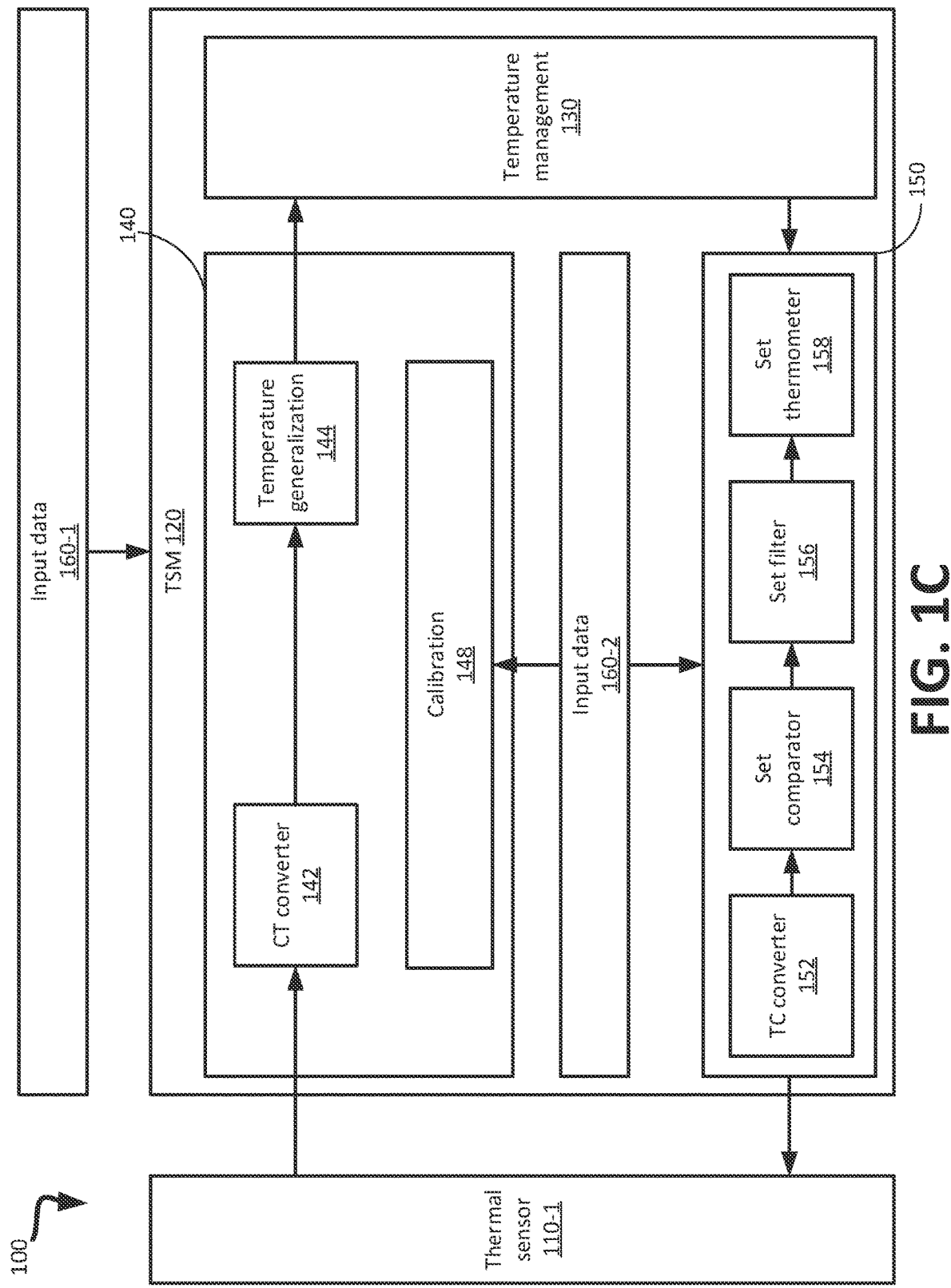

FIGS. 1A-1C illustrate an example system architecture ("system") 100 according to at least one example embodiment. As shown in FIG. 1A, the system 100 includes thermal sensors 110-1 through 110-N in communication with a thermal sensor manager (TSM) 120. For example, the thermal sensors 110-1 through 110-N define a thermal sensor group within a thermal domain of a system (e.g., integrated circuit). Each thermal sensor of the thermal sensor group can obtain (e.g., estimate) an individual hotspot temperature measurement with respect to the hotspot in the thermal domain. As will be described in further detail below, the TSM 120 can derive a generalized hotspot temperature measurement for the hotspot in the thermal domain from the individual hotspot temperature measurements. Each thermal sensor group can have its own fuse allocation at a number of temperatures (e.g., two temperatures).

As shown in FIG. 1B, the thermal sensor 110-1 can include a number of components, including a thermometer 112, a digital filter ("filter") 114, and a protection threshold detector 116. Other thermal sensors of the thermal sensor group (e.g. thermal sensors 110-2 through 110-N) can include similar components. In at least one embodiment, the thermometer 112 can include an analog diode to obtain an analog temperature measurement and an analog to digital (A2D) converter to convert the analog temperature measurement into a digital codeword ("codeword") representing the temperature measurement. In at least one embodiment, the filter 114 can reduce noise (e.g., time-dependent noise). In at least one embodiment, the protection threshold detector 116 can include a digital comparator. The protection threshold detector 116 can compare the temperature measurement to a protection threshold temperature to determine whether to shut down the system 100 due to a risk of overheating.

As shown in FIG. 1C, the TSM 120 can include a temperature management component 130, and a measurement component 140. In at least one embodiment, the measurement component 140 includes a number of subcomponents, including a code to temperature (CT) conversion subcomponent 142, and a temperature generalization subcomponent 144.

In at least one embodiment, the filter 114 can send the codeword for the thermal sensor 110-1 to the measurement component 140. Each of the other thermal sensors 110-2 through 110-N of the thermal sensor group can similarly send codewords representing their individual hotspot temperature measurements to the measurement component 140. Each individual temperature measurement can include temperature measurement from the thermal sensor, in addition to any thermal sensor error affecting the temperature measurement (e.g., noise).

The CT conversion subcomponent 142 can convert each of the codewords received from the thermal sensors 110-1 through 110-N into its respective individual hotspot temperature measurement. The temperature generalization subcomponent 144 can then derive a generalized hotspot temperature measurement from the individual hotspot temperature measurements. In at least one embodiment, the temperature generalization subcomponent 144 can calculate a spatial average of the individual hotspot temperature measurements and an average thermal offset corresponding to the thermal sensor group, and obtain the generalized hotspot temperature measurement by adding the average thermal offset to the spatial average.

The measurement component 140 can receive a set of input data 160-1 that is used to perform the functionality described above. For example, the CT conversion subcomponent 142 can receive fuse data that is used to convert each of the codewords into its respective individual hotspot temperature measurement. As another example, the temperature generalization subcomponent 144 can receive matching data to match thermal sensors to thermal sensor groups, and hotspot to thermal sensor group thermal offset data to obtain the average thermal offset. For example, the matching data can match logical names of the thermal sensors 110-1 through 110-N to physical locations within the system 100 (e.g., logical-to-physical mapping). The matching data and the hotspot to thermal sensor group thermal offset data can be hardcoded into firmware.

As mentioned above, the protection threshold detector 116 can be used to shut the system down if its thermal sensor obtains a hotspot temperature measurement that exceeds a protection threshold temperature. It is noted that the protection threshold detector 116 for a particular thermal sensor utilizes the individual hotspot temperature measurement for the thermal sensor and does not know of the generalized hotspot temperature measurement. Accordingly, a defective thermal sensor can inappropriately shut down the system if it has obtained an incorrectly high hotspot temperature measurement exceeding the protection threshold temperature.

To prevent this scenario, the measurement component 140 can further include a calibration subcomponent 148 that can perform calibration (e.g., on-the-fly calibration) of the protection threshold detector 116 in view of the generalized hotspot temperature measurement. For example, the calibration can be initiated if the generalized hotspot temperature measurement exceeds a calibration threshold temperature (e.g., 105° C.). After initiating the calibration, the calibration subcomponent 148 can receive the generalized hotspot temperature measurement and the individual hotspot temperature measurement obtained from the thermal sensor and calculate a first temperature difference as a difference between the generalized hotspot temperature measurement and the individual hotspot temperature measurement. The calibration subcomponent 148 can further receive a set of input data 160-2, including the current protection threshold and a hotspot to thermal sensor offset. The hotspot to thermal sensor offset can be hardcoded into firmware. The calibration subcomponent 148 can calculate a second temperature difference between the first temperature difference and the hotspot to thermal sensor offset. An updated protection threshold can be obtained by subtracting the second temperature difference from the current protection threshold. The calibration subcomponent 148 can convert the updated protection threshold into a codeword (e.g., using a temperature to code (TC) converter), and then calibrate the protection threshold detector 116 by updating the digital comparator using the updated protection threshold. The updated protection threshold can be greater than the current protection threshold, which accounts for hotspot temperature measurement overestimation due to thermal sensor error. Accordingly, the generalized hotspot temperature measurement can improve a temperature protection mechanism for the system.

The generalized hotspot temperature measurement can be used to improve the temperature management system 130. For example, the generalized hotspot temperature measurement can adjust the thermal response used to cool the system, such as by modifying temperature management parameters (e.g., turn on a fan at a particular speed in accordance with the generalized hotspot temperature measurement). By doing so, fewer resources can be consumed to manage the temperature within the system, which increases temperature management efficiency.

The TSM 120 can further include a programming component 150. The programming component 150 includes a number of subcomponents, including a TC converter 152, a set comparator subcomponent 154, a set filter subcomponent 156, and a set thermometer subcomponent 158. The TC converter 152 can convert the current protection threshold (from the set of input data 160-2) to a codeword (similar to the TC converter implemented by the calibration subcomponent 148), and the set comparator subcomponent 154 can set the digital comparator of the protection threshold detector 116 to the current protection threshold. The set filter subcomponent 156 can set the filter 114 and the set thermometer subcomponent 158 can set the thermometer 112 (e.g., analog diode).

Figure 2:
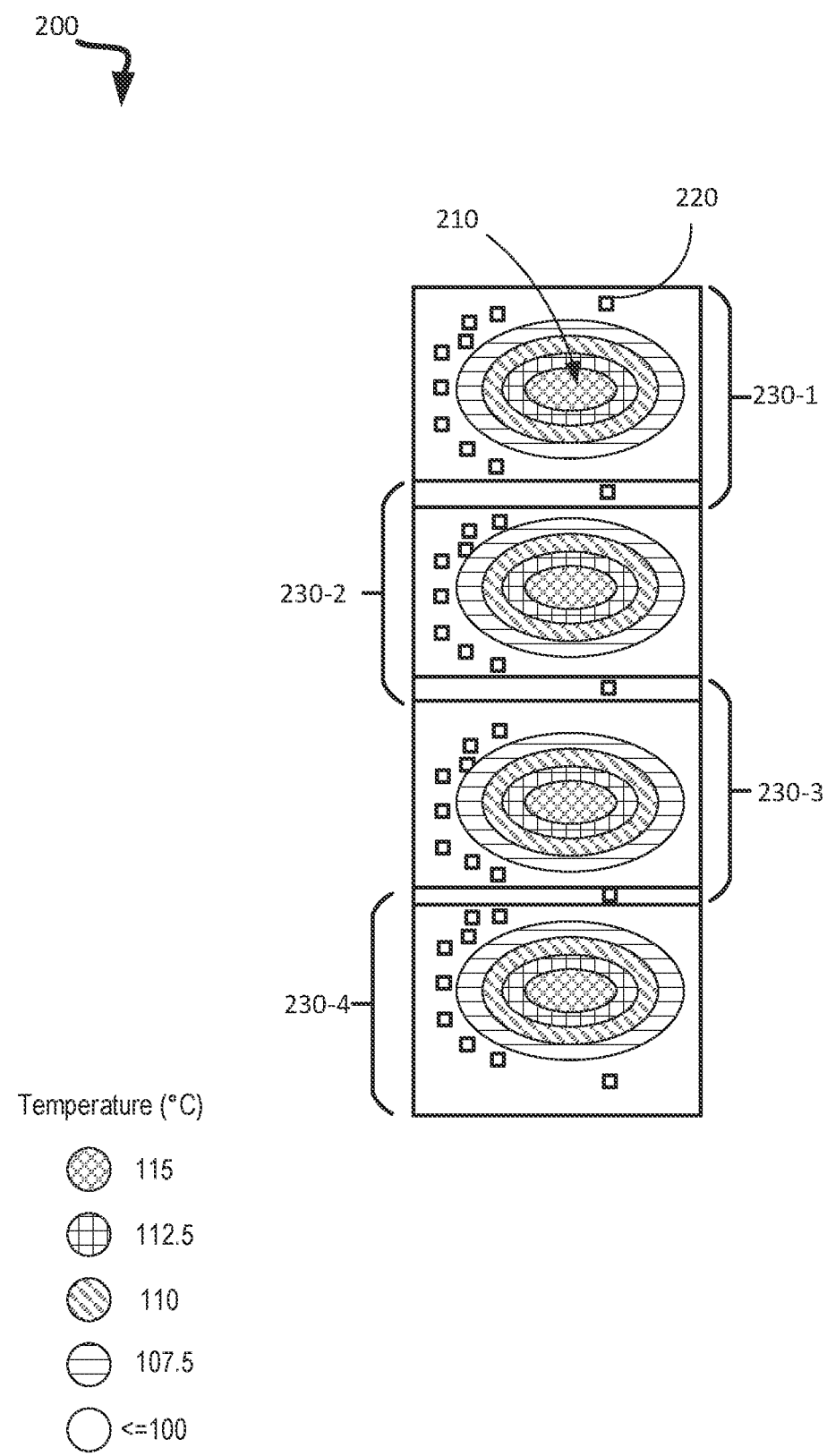
FIG. 2 is a diagram of an example portion of an apparatus including a number of thermal sensor groups, in accordance with at least some embodiments.

FIG. 2 is a diagram of an example portion of a system 200, in accordance with at least some embodiments. As shown, the system 200 includes a number of hotspots, including hotspot 210. For example, each hotspot can be located in a component of an integrated circuit (e.g., communication port). A temperature gradient exists from the hotspot outward, where the hotspot is a hottest region (e.g., about 115° C. as illustrated in FIG. 2). The apparatus 200 further includes a number of thermal sensors, including thermal sensor 220. The thermal sensors are arranged in various locations around the hotspots to measure (e.g., estimate) the temperature of the hotspots.

The system 200 further includes a number of thermal domains 230-1 through 230-4. Each of the thermal domains 230-1 through 230-4 includes a respective hotspot and a respective thermal sensor group having a plurality of thermal sensors for estimating the hotspot temperature of the hotspot. For example, thermal domain 230-1 includes hotspot 210 and a thermal sensor group including the thermal sensor 220. In some embodiments, each of the thermal sensor groups can include respective combinations of different types of thermal sensors. In an embodiment, and as shown, adjacent thermal domains can overlap (e.g., thermal domain 230-1 and thermal domain 230-2), such that the thermal sensor groups of the adjacent thermal domains can share at least one thermal sensor.

In this illustrative embodiment, each of the thermal domains 230-1 through 230-4 has a thermal sensor group, including 10 thermal sensors. However, the number of thermal sensors within each of the thermal domains 230-1 through 230-4 should not be considered limiting. In some embodiments, each of the thermal domains 230-1 through 230-4 includes between 2 sensors and 16 sensors. In some embodiments, each of the thermal domains 230-1 through 230-4 includes between 4 sensors and 14 sensors. In some embodiments, each of the thermal domains 230-1 through 230-4 includes between 8 sensors and 12 sensors. In some embodiments, at least one of the thermal domains 230-1 through 230-4 includes a single sensor.

Each thermal sensor group is designed to improve accuracy in hotspot temperature measurement with respect to the hotspots of its respective thermal domain. For example, as described above with reference to FIGS. 1A-1C, for each of the thermal domains 230-1 through 230-4, a respective generalized hotspot temperature measurement can be obtained utilizing the hotspot temperature measurements made by each of the thermal sensors of the thermal sensor group. In an embodiment, the generalized hotspot temperature measurement is an average of the temperature measurements of the thermal sensors within the thermal sensor group.

For example, assume that a thermal sensor group 230-1 includes N thermal sensors, including thermal sensor 220. An i-th thermal sensor can obtain an estimated hotspot temperature measurement of $T_{HS_i}$, where $T_{HS_i} = T_i + O_i + E_i$, $T_i$ is the temperature measurement made by the i-th thermal sensor, $O_i$ is the thermal offset for the i-th thermal sensor, and $E_i$ is an error term for the i-th thermal sensor (e.g., including thermal sensor noise). For example, the thermal offset $O_i$ can be defined as:

$$O_i = \Delta T_{gradient_i} + E_{gradient_i} \quad (1)$$

and the error term $E_i$ can be defined as:

$$E_i = E_{calibration_i} + N_i \quad (2)$$

where $\Delta T_{gradient_i}$ is the temperature gradient between the i-th thermal sensor and the hotspot, $E_{gradient_i}$ is the temperature gradient error between the i-th thermal sensor and the hotspot, $E_{calibration_i}$ is the calibration error for the i-th thermal sensor (e.g., gain calibration error, offset calibration error and/or non-linearity error), and $N_i$ is the noise of the i-th thermal sensor.

The generalized hotspot temperature measurement for the hotspot 210 within the thermal sensor group 230-1, TG, can be obtained as the average of the N values of $T_{HS_i}$ obtained from each of the N thermal sensors within the thermal sensor group 230-1. For example:

$$T_G = \langle T_{HS_i} \rangle = \frac{1}{N} \sum_{i=1}^{N} T_{HS_i} = \langle T_i \rangle + \langle O_i \rangle + \langle E_i \rangle \quad (3)$$

where $\langle \bullet \rangle$ denotes the average operator, $\langle T_i \rangle$ is the average temperature measurement, $\langle O_i \rangle$ is the average thermal offset and $\langle E_i \rangle$ is the average error term. The offset variance (e.g., difference between the average thermal offset and the individual thermal offsets) and the error term variance (e.g., difference between the average error term and the individual error terms) can each decrease as a function of N. Thus, as the number of thermal sensors within the thermal sensor group 230-1 increases, the generalized hotspot temperature measurement approaches the actual temperature of the hotspot 220 (e.g., the thermal offset variance and the error term variance approach zero as the number of thermal sensors approaches infinity).

In an embodiment, the system 200 includes an integrated circuit. However, the system 200 can be any suitable system that can benefit from improved hotspot temperature measurement accuracy in accordance with embodiments described herein (e.g., a datacenter).

Figure 3:
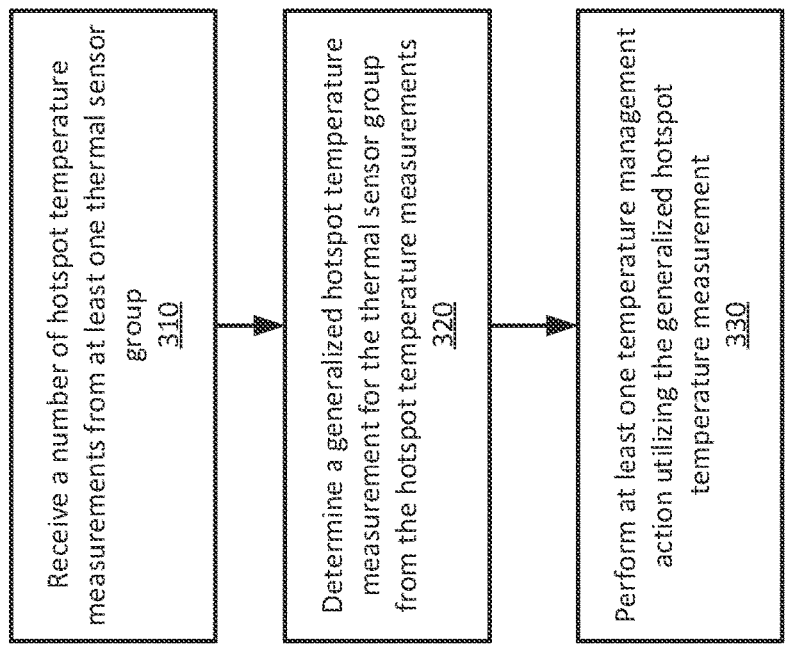
FIG. 3 is a flow diagram of an example method of thermal sensor integration for temperature management, in accordance with at least some embodiments.

FIG. 3 is a flow diagram of an example method 300 of thermal sensor integration for temperature management, in accordance with at least some embodiments. The method 300 can be performed by processing logic comprising hardware, software, firmware, or any combination thereof. In at least one embodiment, the method 300 is performed by the system 100 as described with reference to FIGS. 1A-1C. For example, the method 300 can be performed by the TSM component 120 as described with reference to FIGS. 1A-1C. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a method of thermal sensor integration for temperature management are possible.

At operation 310, processing logic can receive a number of hotspot temperature measurements from at least one thermal sensor group. For example, the thermal sensor group can include a number of thermal sensors. The thermal sensor group is included within a thermal domain that further includes a hotspot, and the thermal sensors of the thermal sensor group can obtain (e.g., estimate) the hotspot temperature measurements with respect to the hotspot. Each hotspot temperature measurement can include a number of temperature measurement components. The temperature measurement components of a hotspot temperature measurement can include the thermal sensor measurement made by the thermal sensor, a thermal offset for the thermal sensor, and an error term for the thermal sensor. For example, the thermal offset for the thermal sensor can be defined as the sum of the temperature gradient between the thermal sensor and the hotspot and the temperature gradient error between the thermal sensor and the hotspot. The error term for the thermal sensor can be defined as the sum of the noise of the thermal sensor and the calibration offset for the thermal sensor.

At operation 320, processing logic can determine a generalized hotspot temperature measurement for the thermal sensor group from the hotspot temperature measurements. For example, the processing logic can calculate an average hotspot temperature measurement from the hotspot temperature measurements. The average hotspot temperature measurement can include an average temperature measurement term, an average thermal offset term and an average error term. The generalized hotspot temperature measurement reduces the variance with respect to the thermal offset and error terms of the hotspot temperature measurements. Accordingly, the generalized hotspot temperature measurement for the thermal sensor group can be considered to have a higher accuracy.

At operation 330, processing logic can perform at least one temperature management action utilizing the generalized hotspot temperature measurement. For example, the at least one temperature management action can include determining whether a hotspot temperature measurement of the thermal sensor exceeds a calibration threshold temperature, and calibrating a protection threshold detector of a thermal sensor in response to determining that the hotspot temperature measurement of the thermal sensor exceeds the calibration threshold temperature. Calibrating the protection threshold detector can include replacing a current protection threshold with an updated protection threshold to account for the thermal sensor being defective.

For example, obtaining the updated protection threshold can include receiving the generalized hotspot temperature measurement and the individual hotspot temperature measurement obtained from the thermal sensor, and calculating a first temperature difference as a difference between the generalized hotspot temperature measurement and the individual hotspot temperature measurement. Obtaining the updated protection threshold can further include receiving the current protection threshold and a hotspot to thermal sensor offset for the thermal sensor. Obtaining the updated protection threshold can further include calculating a second temperature difference as a difference between the first temperature difference and the hotspot to protection offset. Obtaining the updated protection threshold can further include subtracting the second temperature difference from the current protection threshold to calculate the updated protection threshold. The updated protection threshold can be greater than the current protection threshold, which accounts for hotspot temperature measurement overestimation due to thermal sensor error. Accordingly, the generalized hotspot temperature measurement can improve a temperature protection mechanism for the system.

As another example, the at least one temperature management action can include adjusting a thermal response based on the generalized hotspot temperature measurement. In some embodiments, adjusting the thermal response includes modifying a set of temperature management parameters (e.g., turning on a fan at a particular speed in accordance with the generalized hotspot temperature measurement). By doing so, fewer resources need to be consumed to manage the temperature within the system, which increases temperature management efficiency. Further details regarding operations 310-330 are described above with reference to FIGS. 1-2.

Figure 4:
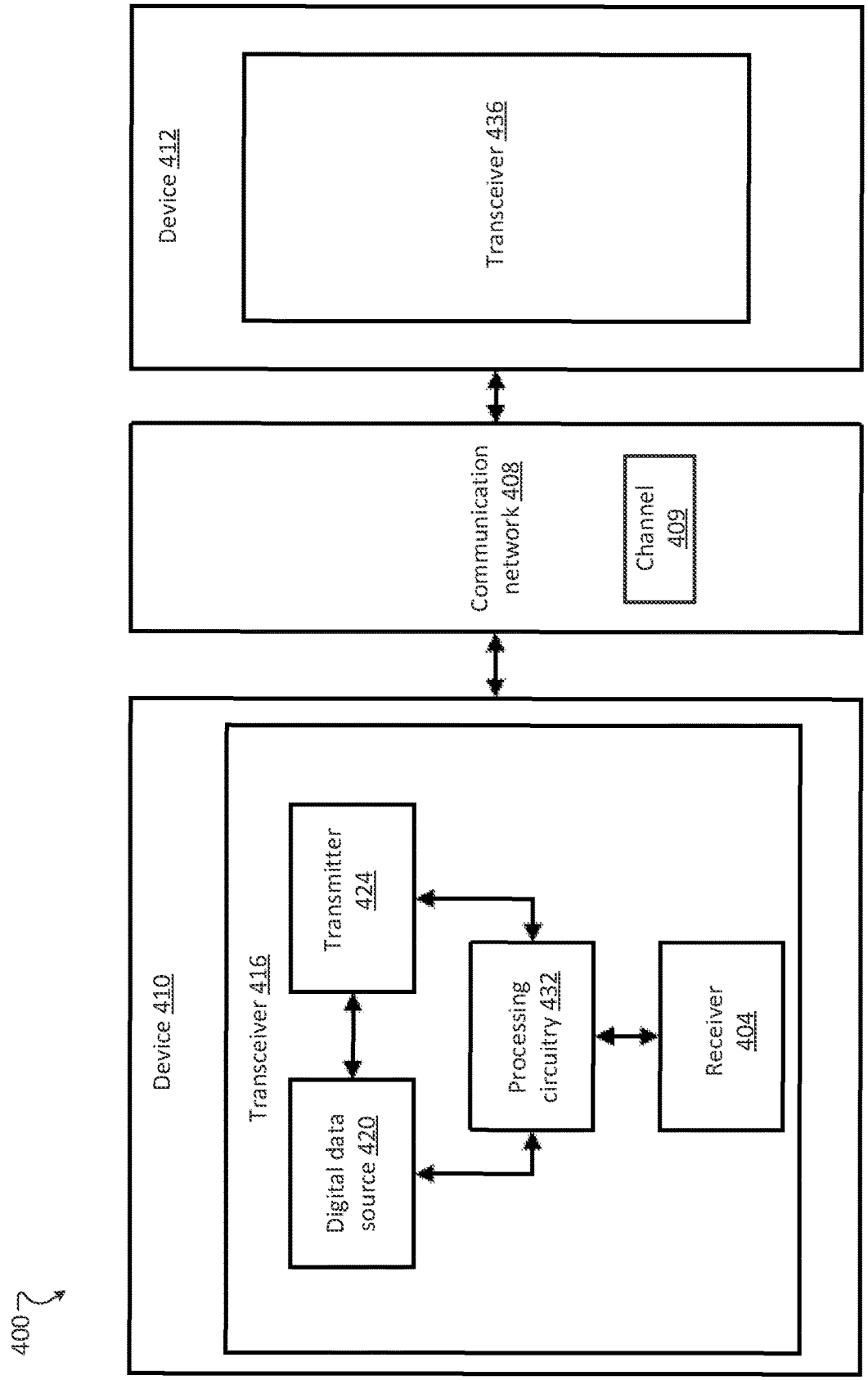
FIG. 4 is an example communication system, in accordance with at least some embodiments.

FIG. 4 illustrates an example communication system 400 according to at least one example embodiment. The system 400 includes a device 410, a communication network 408 including a communication channel 409, and a device 412. In at least one embodiment, devices 410 and 412 are two end-point devices in a computing system, such as a central processing unit (CPU) or graphics processing unit (GPU). In at least one embodiment, devices 410 and 412 are two servers. In at least one example embodiment, devices 410 and 412 correspond to one or more of a Personal Computer (PC), a laptop, a tablet, a smartphone, a server, a collection of servers, or the like. In some embodiments, the devices 410 and 412 may correspond to any appropriate type of device that communicates with other devices connected to a common type of communication network 408. According to embodiments, the receiver 404 of devices 410 or 412 may correspond to a GPU, a switch (e.g., a high-speed network switch), a network adapter, a CPU, a memory device, an input/output (I/O) device, other peripheral devices or components on a system-on-chip (SoC), or other devices and components at which a signal is received or measured, etc. As another specific but non-limiting example, the devices 410 and 412 may correspond to servers offering information resources, services, and/or applications to user devices, client devices, or other hosts in the system 100. In one example, devices 410 and 412 may correspond to network devices such as switches, network adapters, or data processing units (DPUs).

Examples of the communication network 408 that may be used to connect the devices 410 and 412 include an Internet Protocol (IP) network, an Ethernet network, an InfiniBand (IB) network, a Fibre Channel network, the Internet, a cellular communication network, a wireless communication network, a ground referenced signaling (GRS) link, combinations thereof (e.g., Fibre Channel over Ethernet), variants thereof, and/or the like. In one specific but non-limiting example, the communication network 408 is a network that enables data transmission between the devices 410 and 412 using data signals (e.g., digital, optical, wireless signals).

The device 410 includes a transceiver 416 for sending and receiving signals, for example, data signals. The data signals may be digital or optical signals modulated with data or other suitable signals for carrying data.

The transceiver 416 may include a digital data source 420, a transmitter 424, a receiver 404, and processing circuitry 432 that controls the transceiver 416. The digital data source 420 may include suitable hardware and/or software for outputting data in a digital format (e.g., in binary code and/or thermometer code). The digital data output by the digital data source 420 may be retrieved from memory (not illustrated) or generated according to input (e.g., user input).

The transmitter 424 includes suitable software and/or hardware for receiving digital data from the digital data source 420 and outputting data signals according to the digital data for transmission over the communication network 408 to a receiver 404 of device 412. Additional details of the structure of the transmitter 424 are discussed in more detail below with reference to the figures.

The receiver 404 of device 410 and 412 may include suitable hardware and/or software for receiving signals, such as data signals from the communication network 408. For example, the receiver 404 may include components for receiving processing signals to extract the data for storing in a memory, as described in detail below with respect to FIG. 5.

The processing circuitry 432 may comprise software, hardware, or a combination thereof. For example, the processing circuitry 432 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 432 may comprise hardware, such as an application-specific integrated circuit (ASIC). Other non-limiting examples of the processing circuitry 432 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 432 may be provided on a Printed Circuit Board (PCB) or collection of PCBs. It should be appreciated that any appropriate type of electrical component or collection of electrical components may be suitable for inclusion in the processing circuitry 432. The processing circuitry 432 may send and/or receive signals to and/or from other elements of the transceiver 416 to control the overall operation of the transceiver 416.

The transceiver 416 or selected elements of the transceiver 416 may take the form of a pluggable card or controller for the device 410. For example, the transceiver 416 or selected elements of the transceiver 416 may be implemented on a network interface card (NIC).

The device 412 may include a transceiver 436 for sending and receiving signals, for example, data signals over a channel 409 of the communication network 408. The same or similar structure of the transceiver 416 may be applied to transceiver 436, and thus, the structure of transceiver 436 is not described separately.

Although not explicitly shown, it should be appreciated that devices 410 and 412 and the transceivers 416 and 436 may include other processing devices, storage devices, and/or communication interfaces generally associated with computing tasks, such as sending and receiving data.

For example, in some embodiments, one or more components of the communication system 400 may include at least a portion of the system 100 of FIGS. 1A-1C and/or at least a portion of the system 200 of FIG. 2 (e.g., the receiver 404, communication network 408, device 410, device 412, transceiver 416-1, transceiver 416-2, transmitter 424, processing circuitry 432, and/or transceiver 436). For example, one or more of the components of the communication system 400 can each include at least one thermal sensor group, with each thermal sensor group including a number of thermal sensors (e.g., thermal sensors 110-1 through 110-N of FIGS. 1A-1C) located in a thermal domain to measure (e.g. estimate) a respective hotspot temperature of a hotspot within the thermal domain. One or more of the components of the communication system 400 can each further include, or be communicatively coupled to, a thermal sensor manager (TSM) (e.g., TSM 120 of FIG. 1) to obtain a generalized hotspot temperature measurement for the thermal sensor group, and perform at least one temperature management action utilizing the generalized hotspot temperature measurement.

Figure 5:
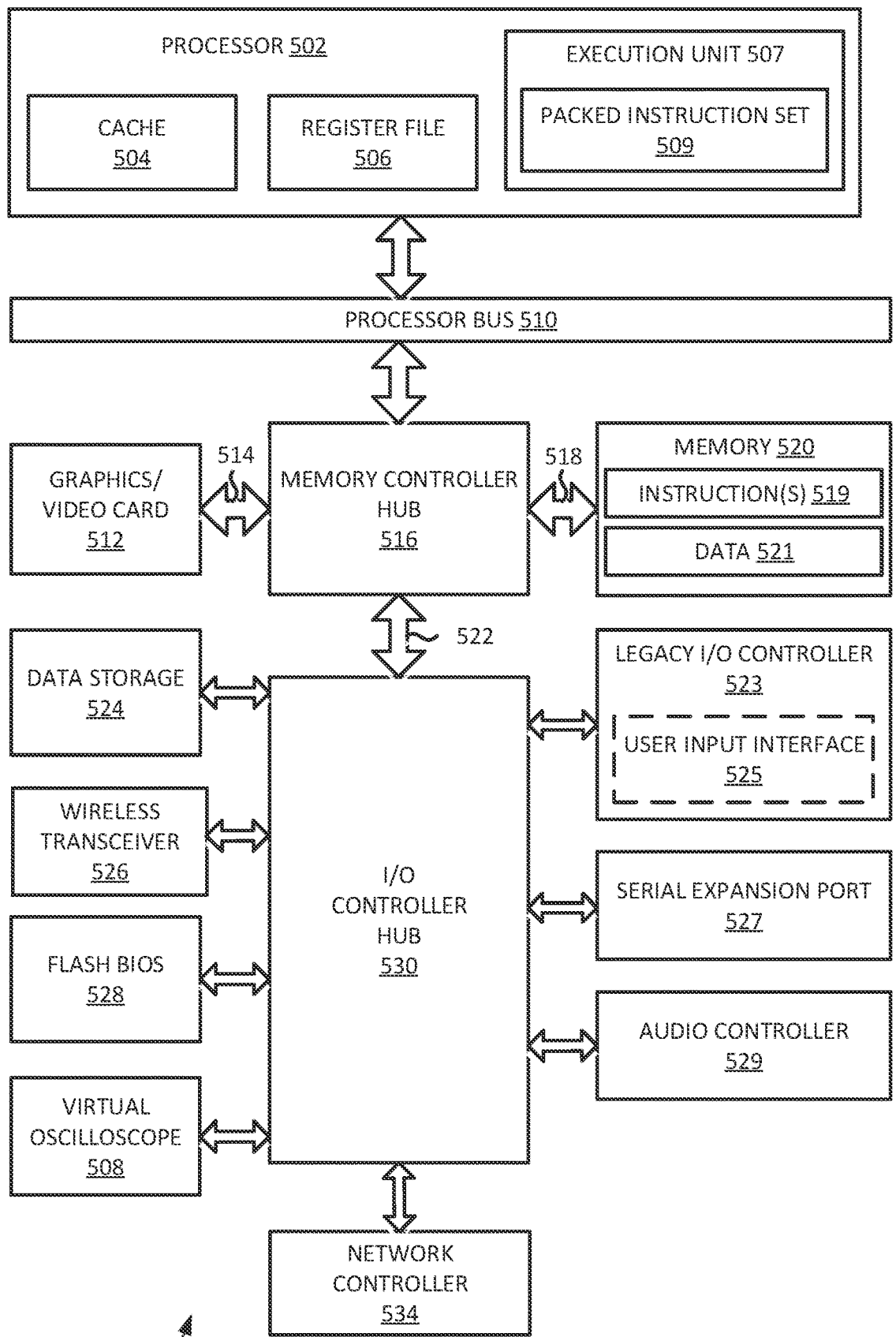
FIG. 5 illustrates an example computer system, in accordance with at least some embodiments.

FIG. 5 illustrates a computer system 500 in accordance with at least one embodiment. In at least one embodiment, computer system 500 may be a system with interconnected devices and components, an SOC, or some combination. In at least one embodiment, computer system 500 is formed with a processor 502 that may include execution units to execute an instruction. In at least one embodiment, computer system 500 may include, without limitation, a component, such as processor 502, to employ execution units including logic to perform algorithms for processing data. In at least one embodiment, computer system 500 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 500 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 500 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 500 may be used in devices such as graphics processing units (GPUs), network adapters, central processing units and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 500 may include, without limitation, processor 502 that may include, without limitation, one or more execution units 507 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 500 is a single processor desktop or server system. In at least one embodiment, computer system 500 may be a multiprocessor system. In at least one embodiment, processor 502 may include, without limitation, a CISC microprocessor, a RISC microprocessor, a VLIW microprocessor, a processor implementing a combination of instruction sets, or any other processor device, such as a digital signal processor, for example. In at least one embodiment, processor 502 may be coupled to a processor bus 510 that may transmit data signals between processor 502 and other components in computer system 500.

In at least one embodiment, processor 502 may include, without limitation, a Level 1 ("L1") internal cache memory ("cache") 504. In at least one embodiment, processor 502 may have a single internal cache or multiple levels of internal cache. In at least one embodiment, cache memory may reside external to processor 502. In at least one embodiment, processor 502 may also include a combination of both internal and external caches. In at least one embodiment, a register file 506 may store different types of data in various registers including, without limitation, integer registers, floating point registers, status registers, and instruction pointer register.

In at least one embodiment, execution unit 507, including, without limitation, logic to perform integer and floating point operations, also resides in processor 502. Processor 502 may also include a microcode ("ucode") read only memory ("ROM") that stores microcode for certain macro instructions. In at least one embodiment, execution unit 502 may include logic to handle a packed instruction set 509. In at least one embodiment, by including packed instruction set 509 in an instruction set of a general-purpose processor 502, along with associated circuitry to execute instructions, operations used by many multimedia applications may be performed using packed data in a general-purpose processor 502. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 500 may include, without limitation, a memory 520. In at least one embodiment, memory 520 may be implemented as a DRAM device, an SRAM device, flash memory device, or other memory device. Memory 520 may store instruction(s) 519 and/or data 521 represented by data signals that may be executed by processor 502.

In at least one embodiment, a system logic chip may be coupled to processor bus 510 and memory 520. In at least one embodiment, the system logic chip may include, without limitation, a memory controller hub ("MCH") 516, and processor 502 may communicate with MCH 516 via processor bus 510. In at least one embodiment, MCH 516 may provide a high bandwidth memory path 518 to memory 520 for instruction and data storage and for storage of graphics commands, data and textures. In at least one embodiment, MCH 516 may direct data signals between processor 502, memory 520, and other components in computer system 500 and to bridge data signals between processor bus 510, memory 520, and a system I/O 522. In at least one embodiment, system logic chip may provide a graphics port for coupling to a graphics controller. In at least one embodiment, MCH 516 may be coupled to memory 520 through high bandwidth memory path 518, and graphics/video card 512 may be coupled to MCH 516 through an Accelerated Graphics Port ("AGP") interconnect 514.

In at least one embodiment, computer system 500 may use system I/O 522 that is a proprietary hub interface bus to couple MCH 516 to I/O controller hub ("ICH") 530. In at least one embodiment, ICH 530 may provide direct connections to some I/O devices via a local I/O bus. In at least one embodiment, a local I/O bus may include, without limitation, a high-speed I/O bus for connecting peripherals to memory 520, a chipset, and processor 502. Examples may include, without limitation, an audio controller 529, a firmware hub ("flash BIOS") 528, a transceiver 526, a data storage 524, a legacy I/O controller 523 containing a user input interface 525 and a keyboard interface, a serial expansion port 527, such as a USB, and a network controller 534. Data storage 524 may comprise a hard disk drive, a floppy disk drive, a CD-ROM device, a flash memory device, or other mass storage device. In an embodiment, the transceiver 526 includes a constrained FFE 508.

In at least one embodiment, FIG. 5 illustrates a system, which includes interconnected hardware devices or "chips" in a transceiver 526—e.g., the transceiver 526 includes a chip-to-chip interconnect including the first device 410 and second device 412 as described with reference to FIG. 1). In at least one embodiment, FIG. 5 may illustrate an exemplary SoC. In at least one embodiment, devices illustrated in FIG. 5 may be interconnected with proprietary interconnects, standardized interconnects (e.g., PCIe), or some combination thereof and utilize a GRS link. In at least one embodiment, one or more components of system 500 are interconnected using compute express link ("CXL") interconnects.

In at least one embodiment, one or more components of computer system 500 may be used to perform temperature management as described with reference to FIGS. 1-3. For example, one or more components of the computer system 500 may include at least a portion of the system 100 of FIG. 1 and/or at least a portion of the system 200 of FIG. 2 (e.g., the wireless transceiver 526). For example, one or more of the components of the computer system 500 can each include at least one thermal sensor group, with each thermal sensor group including a number of thermal sensors (e.g., thermal sensors 110-1 through 110-N of FIGS. 1A-1C) located in a thermal domain to measure (e.g. estimate) a respective hotspot temperature of a hotspot within the thermal domain. One or more of the components of the communication system 400 can each further include, or be communicatively coupled to, a thermal sensor manager (TSM) (e.g., TSM 120 of FIGS. 1A-1C) to obtain a generalized hotspot temperature measurement for the thermal sensor group, and perform at least one temperature management action utilizing the generalized hotspot temperature measurement. In some embodiments, computer system 500 may process or otherwise handle the data output by the system 100 of FIGS. 1A-1C or display such data via a graphical user interface (GUI) of computer system 500.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
a memory device; and
a processing device, operatively coupled to the memory device, to perform operations comprising:
receiving, from a thermal sensor group comprising a plurality of thermal sensors, a plurality of hotspot temperature measurements with respect to a hotspot, each hotspot temperature measurement of the plurality of hotspot temperature measurements being received from a respective thermal sensor of the plurality of thermal sensors, wherein each hotspot temperature measurement of the plurality of hotspot temperature measurements is based on a temperature measurement received from the respective thermal sensor, and a thermal offset of the respective thermal sensor; and
determining, from the plurality of hotspot temperature measurements, a generalized hotspot temperature measurement for the thermal sensor group.

2. The system of claim 1, wherein determining the generalized hotspot temperature measurement comprises obtaining an average hotspot temperature measurement by averaging the plurality of hotspot temperature measurements.

3. The system of claim 1, wherein the thermal offset of the respective thermal sensor is based on a temperature gradient between the respective thermal sensor and the hotspot.

4. The system of claim 1, where the operations further comprise performing at least one temperature management action utilizing the generalized hotspot temperature measurement.

5. The system of claim 1, further comprising an integrated circuit comprising a plurality of thermal domains, wherein the hotspot and the thermal sensor group are comprised within a thermal domain of the plurality of thermal domains.

6. The system of claim 1, wherein each hotspot temperature measurement of the plurality of hotspot temperature measurements comprises a sum of the temperature measurement received from the respective thermal sensor, the thermal offset of the respective thermal sensor, and an error term for the respective thermal sensor.

7. The system of claim 6, wherein the error term for the respective thermal sensor is based on a calibration offset for the respective thermal sensor.

8. A method comprising:
receiving, by a processing device from a thermal sensor group comprising a plurality of thermal sensors, a plurality of hotspot temperature measurements with respect to a hotspot, each temperature measurement of the plurality of hotspot temperature measurements being received from a respective thermal sensor of the plurality of thermal sensors, wherein each hotspot temperature measurement of the plurality of hotspot temperature measurements is based on a temperature measurement received from the respective thermal sensor, and a thermal offset of the respective thermal sensor; and
determining, by the processing device from the plurality of hotspot temperature measurements, a generalized hotspot temperature measurement for the thermal sensor group.

9. The method of claim 8, wherein determining the generalized hotspot temperature measurement comprises obtaining an average hotspot temperature measurement by averaging the plurality of hotspot temperature measurements.

10. The method of claim 8, wherein the thermal offset of the respective thermal sensor is based on a temperature gradient between the respective thermal sensor and the hotspot.

11. The method of claim 8, further comprising performing, by the processing device, at least one temperature management action utilizing the generalized hotspot temperature measurement.

12. The method of claim 8, wherein the hotspot and the thermal sensor group are comprised within a thermal domain of a plurality of thermal domains of an integrated circuit.

13. The method of claim 8, wherein each hotspot temperature measurement of the plurality of hotspot temperature measurements comprises a sum of the temperature measurement received from the respective thermal sensor, the thermal offset of the respective thermal sensor, and an error term for the respective thermal sensor.

14. The method of claim 13, wherein the error term for the respective thermal sensor is based on a calibration offset for the respective thermal sensor.

15. A non-transitory computer-readable storage medium comprising executable instructions that, when executed by a computing system, cause the computing system to perform operations comprising:
receiving, from a thermal sensor group comprising a plurality of thermal sensors, a plurality of hotspot temperature measurements with respect to a hotspot, each temperature measurement of the plurality of hotspot temperature measurements being received from a respective thermal sensor of the plurality of thermal sensors, wherein each hotspot temperature measurement of the plurality of hotspot temperature measurements is based on a temperature measurement received from the respective thermal sensor, and a thermal offset of the respective thermal sensor; and
determining, from the plurality of hotspot temperature measurements, a generalized hotspot temperature measurement for the thermal sensor group.

16. The non-transitory computer-readable storage medium of claim 15, wherein determining the generalized hotspot temperature measurement comprises obtaining an average hotspot temperature measurement by averaging the plurality of hotspot temperature measurements.

17. The non-transitory computer-readable storage medium of claim 15, wherein the thermal offset of the respective thermal sensor is based on a temperature gradient between the respective thermal sensor and the hotspot.

18. The non-transitory computer-readable storage medium of claim 15, wherein the operations further comprise performing at least one temperature management action utilizing the generalized hotspot temperature measurement.

19. The non-transitory computer-readable storage medium of claim 15, wherein each hotspot temperature measurement of the plurality of hotspot temperature measurements comprises a sum of the temperature measurement received from the respective thermal sensor, the thermal offset of the respective thermal sensor, and an error term for the respective thermal sensor.

20. The non-transitory computer-readable storage medium of claim 19, wherein the error term for the respective thermal sensor is based on a calibration offset for the respective thermal sensor.

\* \* \* \* \*